Dec. 14, 1971     W. A. WISEMAN     3,627,467

CONTINUOUS DETECTION METHOD AND APPARATUS

Filed Jan. 31, 1969

INVENTOR
WILLIAM ANTONY WISEMAN
BY Hofman, Blasonk, Downing &
Seebred ATTORNEYS

United States Patent Office 3,627,467
Patented Dec. 14, 1971

3,627,467
CONTINUOUS DETECTION METHOD
AND APPARATUS
William Antony Wiseman, The Mill House,
Bray, Berkshire, England
Filed Jan. 31, 1969, Ser. No. 796,318
Claims priority, application Great Britain, Feb. 2, 1968,
5,526/68
Int. Cl. G01m 27/26
U.S. Cl. 23—230
13 Claims

ABSTRACT OF THE DISCLOSURE

A method of measuring a component in a gas stream which involves adding a reactive gas to the stream to react with said component, detecting the level of reactive gas after reaction and generating further compensatory, reactive gas in an electrolytic cell for addition to the gas stream whereby the current flowing in the cell is an accurate measure of gas consumption and hence of the component to be measured is improved by operating the reaction intermittently and averaging e.g. integrating the current during periods of reaction and non-reaction.

---

Figure 1:
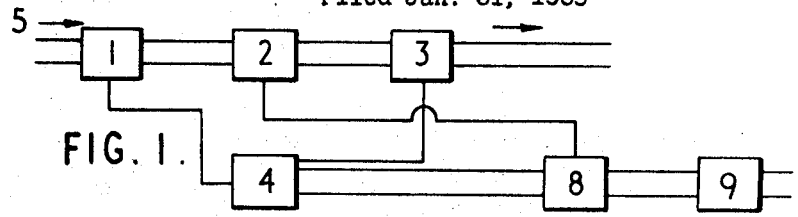

This invention relates to a continuous detection and measurement method and is a modification of the method described in British Pat. No. 1,112,771, the disclosure of which is hereby incorporated by way of reference.

British Pat. No. 1,112,771 describes a continuous method of detecting or measuring a component of a gas stream which comprises incorporating a predetermined proportion of a gas reactive with the component to be detected or measured into the gas stream; allowing the component of the mixture to react with the incorporated gas; detecting the presence or the amount of incorporated gas after reaction; using a signal so obtained to control the generation of a compensatory amount of the gas reactive with the component to be measured, and feeding the compensatory amount of gas into the detector; and detecting or measuring work done in the generation of the compensatory amount of gas.

The said British patent also describes apparatus for detecting or measuring a component of a gas stream by the method described above, comprising: a gas-generator for a reactive gas, a reaction zone, and a detector for unused reactive gas, arranged in series in a gas-flow system; an electrical feed-back circuit for conveying the signal from the detector to the gas-generator; and means to measure or detect work done by the generator.

This system is known as the reaction coulometer.

This invention concerns an adaptation of the reaction coulometer to measure components continuously in a continuously flowing gas stream.

The reaction coulometer can be operated with a number of working substances of which hydrogen and oxygen are the two most commonly used. In describing the mode of operation of this new invention the example will be used of oxygen as the reactant and of combustible material as the substance to be detected. However, the operation of the invention is not dependent on this mode of operation only and can be used with any other reactant and any other material to be detected, provided a suitable system çan be devised. Thus, for instance, the method would be particularly useful in detecting traces of oxygen in a gas stream, in which case the reactant is most conveniently hydrogen.

The reaction coulometer system described in the above British patent was designed with the requirements of gas chromatography in mind. In gas chromatography an important feature is that components to be detected and measured are eluted from the column in discrete quantities. Measurement of the amount of material eluted and subsequently reacted can be carried out with respect to an arbitary base line representing a standard level of oxygen in a continuously flowing carrier gas stream. In this way the problem of what level of combustible material is present in the stream of carrier gas itself is irrelevant.

It is not possible to measure the quantity of reactable components in the carrier gas stream by direct measurement of the current in the generator. This is because this current is due to the action on the detecting cell of three things: Firstly, it depends on the basic current in the detector cell. This is a current which flows in the detector cell in the absence of oxygen. Secondly, it depends on the current due to the presence of oxygen in the carrier gas. This oxygen comes partly from the current which may be flowing in the generator and partly from the amount of oxygen in the carrier gas itself. Thirdly, it depends on the reaction in the reactor between any combustible material in the carrier gas and the oxygen in the carrier gas.

Since the level of generation can be set by adjusting at random the controls on the amplifier in the loop it is not possible to determine the contribution due to this unless some further step is taken which will enable its contribution to be isolated.

This application concerns a method of doing this. Essentially it consists of turning the reactor on and off (or by activating and de-activating it in some other way such as by diverting the gas stream away from the reactor intermittently) at definite intervals and averaging, or more preferably integrating, the current flowing in the generator on one hand during the periods when the reactor is on, and on the other hand during the periods when the reactor is off. If there is any combustible material in the carrier gas these two integrals will be different and the difference will be a quantified measure (in coulombs) of the amount of combustible material present.

It is important to bear in mind that the difference between the two integrals themselves refers to the weight of material combusted during the time the reactor is "on" irrespective of the gas flow. The gas flow is only needed to calculate the concentration of combustible material in the gas stream. This technique has enormous advantages where very small quantities of combustible material are present. This is so because by carrying out the averaging process or integration for fairly lengthy periods of time the noise of the system, if any, can be integrated approximately to zero and hence, any changes of signal an order of magnitude or so less than the noise can be quantified.

Suitable systems are shown in FIGS. 1–4.

Figure 1A:
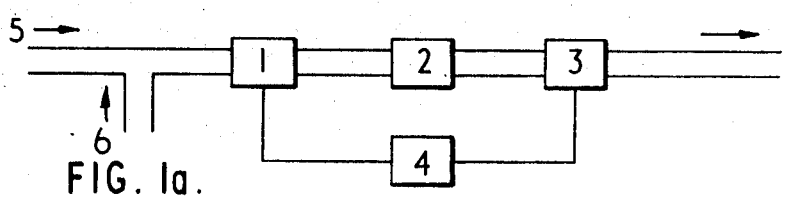
Figure 1B:
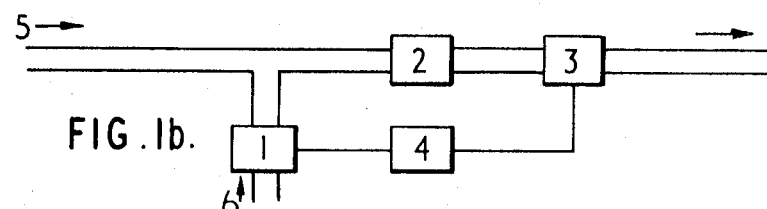

In FIG. 1, 1 is a generator, 2 a reactor, 3 a detector for the generator and 4 the feedback amplifier. These four items constitute a basic reaction coulometer loop with gas flow along 5 through 1, 2 and 3 and electrical connection from 3 to 1 via 4. Alternative arrangements incorporating an auxiliary gas flow 6 are shown in FIGS. 1a and 1b. 8 and 9 are respectively an integrator and a means of presenting the integral or calculating the result of integration. 8 also contains a control for switching on and off the reactor (or activating and de-activating it by some other means).

Figure 2:
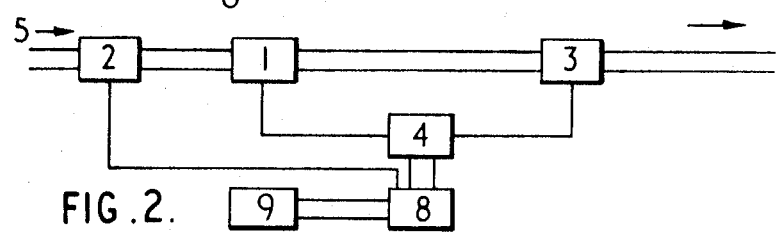

FIG. 2 illustrates a generally similar system but with reactor 2 outside the reaction coulometer loop.

Figure 3:
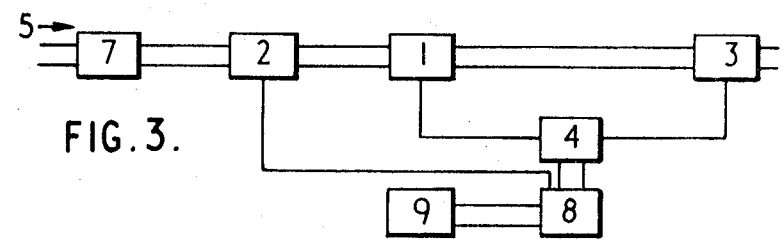

FIG. 3 extends this principle to include a second generator 7. The reactor 2 can be inside or outside the reaction coulometer loop but the second generator 7 ensures in the latter case that there is sufficient oxygen or other generant in the gas stream 5 to react with the combustible materials in the reactor 2. If the reactor has to be of large volume it is advantageous to place it outside the loop. This also facilitates the analysis of a second gas stream provided the flow rate of the two streams is known.

Figure 4:
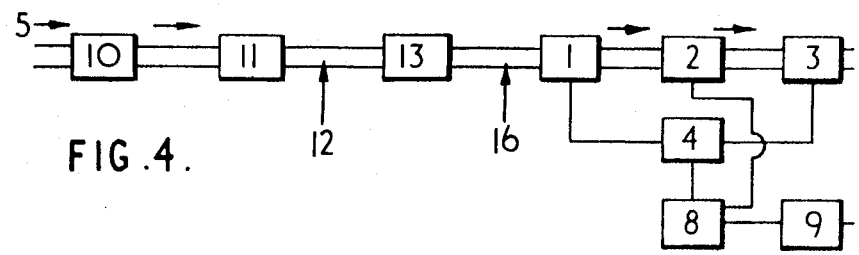

FIG. 4 illustrates yet another arrangement according to the invention, 10 is a generator and 11 a reactor, 1, 2, 3, 4, 8 and 9 represent an reaction coulometer loop as described above, with the integrator etc. Gas stream 5 flows from left to right as indicated by the arrow. In doing so it passes through an exchange system 13. The effect of generator 10 and reactor 11 is to reduce to a very low level the amount of combustible material in the gas stream so that at 12 the gas stream is "clean." The exchange system 13 then introduces combustible material into the gas stream. The amount of such material at 16 is now estimated by the reaction coulometer loop in the manner outlined above. In 13, for example, an exchange may take place between the gas stream 5 and water so that traces of hydrocarbons in the water are removed and continuously estimated. Exchange system 13 may include another stream of gas in which still further reactions may be carried out before mixing with gas stream 5. Alternatively, exchange system 13 may be such that gas stream 5 interacts with water or other liquid to remove oxygen, in which case generators 1 and 10 will be provided for generating hydrogen and detector 3 will be a hydrogen detector. In each of the above-noted arrangements, the reaction between the gas stream 5 and the water or other liquid may be facilitated by bubbling the gas stream through such liquid by any suitable known means.

To illustrate the operation of the invention still further, suppose the current in generator 1 to be $I_1$ amps when the reactor is off and $I_2$ amps when it is on. $I_1$ and $I_2$ are functions of time. Then the number of coulombs over a time $t_1$ seconds when the reactor is off is $\int_0^{t_1} I_1 dt$. If the reactor is on for $t_2$ seconds then the number of coulombs is $\int_0^{t_2} I_2 dt$.

Hence the average current when the reactor is off is $\int_0^{t_1} I_1 dt \div t_1$ and the average current when the reactor is on is $\int_0^{t_2} I_2 dt \div t_2$. The latter function is higher than the former and the difference represents the extra current due to the combustible material in the reactor. If this average extra current is $\Delta I$ amps this can be converted to an average concentration of combustible material in the gas stream over the period $(t_1+t_2)$ second in accordance with the following formula:

$$\text{Concentration} = 2.59 \times 10^{-6} \frac{M}{z} \cdot \frac{\Delta I}{V} \text{ gms./ml.}$$

where V is the average volume rate of gas flow in ml./sec., M is the molecular weight of the compound being combusted and z is the number of $O_2$ equivalents needed to burn completely out a gram molecule of the compound.

It will be noted that the volume rate of gas flow should be known. This does not usually present a problem. Also, while $M/z$ is a factor which varies generally from compound to compound, it generally lies close to 9.0 for most hydrocarbons and equals 9.33 for the general hydrocarbon $CH_2$. It will only be possible to give an exact answer in gms./ml. if the nature of the combustible compound is known but for most purposes where traces of combustible material are concerned the general formular $CH_2$ is sufficient. In any case only average results are possible. In cases where other reactants etc. are involved the numerical constants etc. in the formula may be different but the method of calculation will be much the same.

It will be appreciated from the embodiments shown by way of example that in a broad form the present invention provides a continuous method of measuring a component of a gas stream which comprises: incorporating into the gas stream a predetermined proportion of a reagent gas reactive with the component to be measured; allowing the component of the mixture to react intermittently in a reactor with the reagent gas; detecting the amount of reagent gas present after the reactor during periods of reaction and during periods of non-reaction; using a signal so obtained to control the generation of reagent gas in an electrolytic generator so as to compensate for any reagent gas reacted in the reactor, and feeding reagent gas from the generator to the detector; measuring current flowing in the generator during periods of reaction and during periods of non-reaction; calculating averages of current during the two types of period; and using the difference between the averages to measure the amount of the component in the gas stream.

Usually the averages of current are calculated by an integration of the current over the two types of period.

I claim:

1. A method of measuring a component of a continuously flowing gas stream which comprises: incorporating into said gas stream a predetermined proportion of a reagent gas reactive with the component to be measured; allowing said component of the mixture to react intermittently in a reactor with the reagent gas to provide thereby a series of periods of reaction and a series of periods of non-reaction; detecting the amount of said reagent gas present downstream of the reactor during said periods of reaction and during said periods of non-reaction; using a detected signal so obtained to control the generation of reagent gas in an electrolytic generator so as to compensate for any reagent gas reached in the reactor, and feeding said generated reagent gas from the generator to the detector; measuring a first current flowing in the generator during periods of reaction and a second current flowing in the generator during periods of non-reaction; calculating the average current values of said first and second; and using the difference between the average values as a measure of the amount of the component in the gas stream.

2. A method as claimed in claim 1, wherein the calculation of said average values of said first and second currents is effected by integration over the respective periods.

3. A method as claimed in claim 1, wherein the reaction between the component to be measured and the reagent gas is effected upstream of feed of reagent gas from the generator.

4. A method as claimed in claim 1, wherein the reaction between the component to be measured and the reagent gas is effected downstream of feed of reagent gas from the generator.

5. A method as claimed in claim 2, which comprises supplying an additional predetermined supply of reagent gas upstream of the reaction between the component to be measured and the reagent.

6. A method as claimed in claim 1 comprising contacting a gas stream, essentially free from any component reactive with said reagent gas, with a material to be analysed to incorporate therein small amounts of a component to be measured reactive with said reagent gas, and thereafter subjecting the resulting gas stream to the measurement method.

7. A method as claimed in claim 6 wherein the material to be analysed is in liquid form and contact is effected by bubbling the gas stream through said liquid.

8. A method as claimed in claim 7 comprising prior cleaning of the gas stream with respect to the component to be reacted with said reagent gas and then measured, by prior reaction with incorporated reagent gas to reduce said component to a very low level.

9. Apparatus for measurement of a component of a gas stream, comprising an electrolytic cell for generating a reactive gas, a reaction zone, and a detector for unused reactive gas, arranged in series in a gas-flow system; an electrical feedback circuit for conveying a signal from the detector to the electrolytic cell; an electrical integrator including switching means for activating and deactivating said reaction zone to provide a first series of periods when reaction is being effected and a second series of periods when no reaction is being effected so that integration may be effected for each series of periods independently; and read-out means for presenting or calculating the result of said integration.

10. Apparatus as claimed in claim 9 wherein the reaction zone is downstream of the electrolytic cell in said gas-flow system.

11. Apparatus as claimed in claim 9 wherein the reaction zone is upstream of the electrolytic cell in said gas-flow system.

12. Apparatus as claimed in claim 11 comprising an additional electrolytic cell for generating reactive gas upstream of the reaction zone in said gas-flow system.

13. Apparatus as claimed in claim 9 including upstream of the electrolytic cell, reaction zone and detector, and in series in the same gas-flow system, an additional electrolytic cell for generating reagent gas, a prior reaction zone whereby said gas can react with any reactive components in the gas stream to clean said gas of reactive components, and a gas/liquid exchange means for contacting said clean gas stream with a liquid containing a component to be measured.

References Cited
UNITED STATES PATENTS

| | | | |
|---|---|---|---|
| 1,710,772 | 4/1929 | Hepburn. | |
| 2,083,521 | 6/1937 | Miller. | |
| 2,925,327 | 2/1960 | Katz et al. | 23—232 X |
| 3,096,157 | 7/1963 | Brown et al. | 23—254 X |
| 3,240,554 | 3/1966 | Angerhofer. | |
| 3,304,170 | 2/1967 | Hinsvark | 23—232 |
| 3,342,558 | 9/1967 | Reinecke | 23—232 E |
| 3,436,188 | 4/1969 | Boyd et al. | 23—230 |

JOSEPH SCOVRONEK, Primary Examiner

U.S. Cl. X.R.

23—230 M, 232 E, 253, 254 E, 255 E; 204—1 T, 195 T